Patented Jan. 11, 1938

2,104,783

UNITED STATES PATENT OFFICE 2,104,783

MANUFACTURE OF POROUS BODIES

Maxwell L. Whitacre and Peter de Leeuw, Niagara Falls, N. Y., assignors, by mesne assignments, to The Carborundum Company, Niagara Falls, N. Y., a corporation of Delaware No Drawing. Application December 8, 1933, Serial No. 701,568. Renewed March 20, 1937

22 Claims. (Cl. 25—156)

This invention relates to the manufacture of porous articles comprising granular material and a binder therefor and has for its object the improvement of such articles and of the method of making them.

Porosity is an important factor in refractory material and in ceramic ware because of its effect upon density, strength, coefficient of expansion, thermal conductivity and susceptibility to various finishes, and in abrasive articles because of its effect upon grinding action, permissible grinding temperature, behavior when liquid coolants are used and especially upon the character of finish possible in certain work such as soft metals and metallic alloys.

Several methods of producing porosity in bonded granular material have been proposed, one of which involves the generation of a gas within a slip or slurry comprising the granular material, a binder therefor and a liquid. The gas released within the slip or slurry causes the article made therefrom to be more porous, but inasmuch as the size, regularity, uniformity and disposition of the gas bubbles have a material bearing upon the character of the finished article, it has not been possible heretofore to produce uniform results by such method.

In order to give a clear comprehension of this invention, a brief description of some of the methods of obtaining porosity by generating gas in the mix is offered. For example, a slip or slurry containing the bonding material and the granular material is made. There is then added to this mixture a predetermined amount of hydrogen peroxide, sodium peroxide, sodium perborate, ammonium persulphate or other similar solution capable of releasing a gas when it decomposes. The gas thus released causes the grains to be spaced further apart, with the result that the porosity of the article is greater.

In the methods previously proposed the evolution of the gas began immediately after the gas producing substance was introduced into the mix, so that insufficient time was allowed for proper mixing and molding; in fact, a large quantity of gas was lost; furthermore, contiguous bubbles were apt to unite thus increasing the size of some of the pores over others. The result was seldom a uniform body, free from weakening fissures caused by over-large bubbles.

In accordance with the present invention the previous difficulties are avoided by controlling the time at which the gas is released and also the rate at which it is released. In other words, the decomposition of the gas generating compound is restrained so that not more than a negligible amount of gas evolution takes place prior to placing the mix in the mold. Thus, the mixture containing the material capable of generating a gas may be said to be a balanced or stable slip or slurry. As long as the balance is maintained the amount of gas evolved is negligible, and when the mixture becomes unbalanced or unstable the rate of gas evolution depends upon the degree of unbalance.

The too rapid decomposition of the gas generating material can be obviated in several ways. One method includes the addition of certain substances that act as stabilizing agents. It is not known in exactly what manner stabilizing agents such as acetanilid, magnesium sulphate and the like, alone or in combination, act to retard the decomposition of the gas generating solution, but it has been proved that their addition does retard the decomposition to such an extent that during the period of mixing and placing in a mold no appreciable decomposition takes place so that no detrimental bubbles are formed.

In addition to their use as stabilizing agents such a compound may be added which otherwise has a beneficial effect on the grit, for example, sodium pyrophosphate, sodium stannate or the like may be added to the slip or slurry. These materials have been found to be particularly satisfactory because they perform a dual function, namely that of retarding the decomposition of the gas generating compound, and that of deflocculating the mix so that the same fluidity is obtained with less water. A shorter drying period is required because there is less water to remove.

Stability of the decomposing substance is also maintained by raising the hydrogen ion concentration of the mix. A certain predetermined percentage of an acid solution, for example sulphuric acid, added to the mix will lower the pH value of the mix and improve its stability.

Another method of restraining the decomposition of the decomposing substance is the removal of the catalytic substances from the basic ingredients of the mix. This can be done by treating the grain with hydrochloric acid and washing it free from acid and drying, and also washing the clay with a sulphuric acid solution and rewashing. With the catalysts so removed from the basic ingredients, the addition of inhibiting solutions is not necessary and the decomposition of the solution is so efficiently controlled by temperature regulation that the product resulting has excellent porosity and perfect uniformity. It is, moreover, both possible and desirable in some instances to combine definite types of bonds and grains so that the decomposing effect of one on the gas evolving substance is neutralized by the other.

The decomposition of the gas generating solution can be further retarded by keeping the temperature of the mixture low during the period when evolution of gas is not desired; e. g. during the mixing period and while the mix is being placed in the mold. Refrigerated mixers and molds can be used for this purpose.

Specific examples of suitable mixtures for abrasive articles are as follows:

I. 4000 gms. of fused alumina or crystalline alumina, 2000 gms. of a clay bond and 1600 cc. of water containing 4 gms. of acetanilid and 20 cc. of ethyl alcohol are mixed together for 15 minutes. 300 cc. of a 2.5% glue solution is then added and mixed for 10 minutes, after which 300 cc. of a 1.5% solution of hydrogen peroxide is added and mixed with the entire mixture for 2 minutes. Immediately thereafter the mix is placed in a mold and dried at room temperature for 48 hours. The evolution of the gas commences after the mix is placed in the mold and the resultant product is very satisfactory as to porosity and uniformity of structure.

II. 4000 gms. of fused alumina or crystalline alumina, 2000 gms. of a clay bond and 1600 cc. of water containing a mixture of 7.2 gms. of anhydrous sodium pyrophosphate and one gram of sodium stannate are mixed together for 15 minutes, and to this is added 300 cc. of a 2.5% glue solution and the mass mixed for 5 minutes. Then 300 cc. of a 1.5% hydrogen peroxide solution is added and the mixing continued for 2 minutes. The mix is then placed in a mold and dried.

III. 4000 gms. of fused alumina or crystalline alumina, 2000 gms. of a clay bond and 1600 cc. of water containing 100 cc. of sulphuric acid are stirred together in a mixer for 15 minutes. 300 cc. of a 2.5% glue solution is then mixed in for 5 minutes and 300 cc. of a 1.5% hydrogen peroxide solution is added and the entire mass mixed for 2 minutes. The mix is then puddled into a mold to eliminate air bubbles and dried at room temperature.

Another way of carrying out this invention is to first acid treat the basic ingredients of the mix. The grain is treated with a dilute hydrochloric acid solution, washed free from acid and dried; the clay bond is washed with enough sulphuric acid to give a hydrogen ion concentration of pH 1.7. After standing over night the clay is washed until the pH reaches 6.6 when it is dried. Then 4000 gms. of the treated grain, 2000 gms. of the treated clay and 1600 cc. of water are mixed together for 15 minutes. 300 cc. of a 2.5% glue solution is then added and mixed in for 5 minutes. Then 300 cc. of a 1.5% hydrogen peroxide solution is added and the mixing continued for 2 minutes, after which the mix is placed in a mold and dried at room temperature.

Large gas or air bubbles present in the mix prior to forming show up as large pores which weaken the final structure and cause ununiform porosity. To eliminate air and gas bubbles formed during the mixing, puddling the mix into the mold has been found advisable instead of casting, as puddling allows such bubbles to be readily removed before drying. In this way all bubbles present in the final article are formed during the drying process and the result is uniform porosity and structure.

Limitation to the methods described above is not desired, but rather protection within the scope of the following claims:

We claim:

1. In the method of making porous bodies which comprises forming a slip containing gas generating material and permanent ingredients including a catalyst for the gas generating material, the steps comprising forming the ingredients into a stable slip, puddling the slip into a mold, unstabilizing the slip, permitting evolution of gas to swell the slip, and thereafter drying the slip.

2. In the method of making porous bodies which comprises forming a slip containing a peroxide and permanent ingredients including a decomposition catalyst for the peroxide, the steps comprising forming a stable slip from the ingredients, puddling the slip into a mold, unstabilizing the slip, permitting evolution of gas to swell the slip, and thereafter drying the slip.

3. In the method of making porous bodies which comprises forming a slip containing gas generating material and permanent ingredients including a catalyst for the gas generating material, the steps comprising forming the ingredients into a slip, incorporating in the said slip a stabilizer for the gas generating material, puddling the slip into a mold, unstabilizing the slip, permitting evolution of the gas to swell the slip, and thereafter drying the slip.

4. The method of making porous bodies which comprises forming a slip or slurry containing hard, inert, insoluble granular material, a binder therefor capable of setting to form with the granular material a strong, rigid structure, a peroxide and a stabilizer for said peroxide, and forming said slip or slurry into the desired shape before said peroxide starts to evolve gas.

5. The method of making porous bodies which comprises forming a slip or slurry containing hard, inert, insoluble granular material, a binder therefor capable of setting to form with the granular material a strong, rigid structure, hydrogen peroxide, glue and sodium pyrophosphate, forming said slip or slurry into the desired shape in a mold and heating the material in the mold to cause said hydrogen peroxide to decompose.

6. In the gas evolving process of making porous bodies the step comprising the addition of sodium pyrophosphate to the mix to retard the evolution of gas.

7. In the process of making porous bodies the steps comprising removing the catalysts from the basic ingredients, mixing said basic ingredients with a gas evolving substance and controlling the rate of gas evolution by varying the rate of decomposition of the gas evolving substance.

8. In the process of making porous bodies the steps comprising removing the catalysts from the ingredients, mixing said ingredients with a gas evolving substance, and drying the mass at a predetermined temperature to effect a predetermined rate of gas evolution.

9. In the process of making porous bodies the steps comprising the removal of catalysts from the ingredients by treating said ingredients with an acid, mixing said acid treated ingredients with a gas evolving substance, and drying the said mix at predetermined varying temperatures to effect a predetermined varying rate of gas evolution.

10. In the process of making porous bodies the steps comprising forming a slip or slurry containing hard, inert, insoluble granular material, a binder therefor capable of setting to form with the granular material a strong, rigid structure and water and having a predetermined restraining effect upon the evolution of gas from a gas evolving substance, and adding to the slip or slurry thus formed the gas evolving substance.

11. In the process of making porous bodies the steps comprising forming a slip or slurry containing hard, inert, insoluble granular material, a binder therefor capable of setting to form with the granular material a strong, rigid structure and water and having a predetermined restraining effect upon the evolution of gas from a gas evolving substance, and adding to the slip or slurry thus formed a substance capable of evolving gas and deflocculating the slip or slurry.

12. In the process of making porous bodies the steps comprising mixing the basic ingredients with a gas evolving substance and controlling the rate of gas evolution by the addition of a solution having a restraining effect upon the decomposition of the said gas evolving substance and a deflocculating effect upon the mixture of the basic ingredients.

13. In the method of making porous bodies which comprises forming a slip containing gas generating material and permanent ingredients including a catalyst for the gas generating material the steps comprising adding to the slip a stabilizer for the gas generating material, placing the slip in a mold, and thereafter drying the said slip after evolution of gas.

14. In the method of making porous bodies which comprises forming a slip containing a peroxide and permanent ingredients including a decomposition catalyst for the peroxide, the steps comprising adding to the slip a stabilizer for the peroxide, placing the slip in a mold, and thereafter drying the said slip after evolution of gas.

15. In the method of making porous bodies which comprises forming a slip containing gas generating material and permanent ingredients including a catalyst for the gas generating material, the steps comprising adding to the slip a stabilizer for the gas generating material, puddling the slip into a mold, accelerating the generation of the gas, permitting evolution of gas to swell the slip, and thereafter drying the slip.

16. In the method of making porous bodies which comprises forming a slip containing a peroxide and permanent ingredients including a decomposition catalyst for the peroxide, the steps comprising adding to the slip a stabilizer for the peroxide, puddling the slip into a mold, accelerating the decomposition of the peroxide by application of heat to the slip, and thereafter drying the said slip.

17. In the method of making porous bodies which comprises forming a slip containing a peroxide and permanent ingredients including a decomposition catalyst for the peroxide, the steps comprising incorporating in the slip sodium pyrophosphate, puddling the slip into a mold, permitting evolution of gas to swell the slip, and thereafter drying the slip.

18. In the method of making porous bodies which comprises forming a slip containing a peroxide and permanent ingredients including a decomposition catalyst for the peroxide, the steps comprising incorporating in the slip sodium stannate, puddling the slip into a mold, permitting evolution of gas to swell the slip, and thereafter drying the slip.

19. In the method of making porous bodies which comprises forming a slip containing a peroxide and permanent ingredients including a decomposition catalyst for the peroxide, the steps comprising incorporating in the slip magnesium sulphate, puddling the slip into a mold, and thereafter drying the said slip after evolution of gas.

20. The method of making porous bodies by the puddle method which comprises treating the basic ingredients thereof to remove therefrom decomposition catalyst for hydrogen peroxide, forming the basic ingredients into a slip, incorporating a per-oxygen compound in the slip, puddling the slip into a mold, accelerating the decomposition of the peroxide, permitting evolution of gas to swell the slip and thereafter drying the slip.

21. The method of making porous bodies by the puddle method which comprises treating with acid the basic ingredients thereof to remove therefrom decomposition catalyst for hydrogen peroxide, forming the basic ingredients into a slip, incorporating a per-oxygen compound in the slip, puddling the slip into a mold, accelerating the decomposition of the peroxide, permitting evolution of gas to swell the slip and thereafter drying the slip.

22. The method of making porous bodies by the puddle method which comprises treating the basic ingredients thereof to remove therefrom decomposition catalyst for hydrogen peroxide, forming the basic ingredients into a slip, incorporating a per-oxygen compound in the said slip, puddling the slip into a mold, applying heat to the said slip to accelerate the decomposition of the peroxide, permitting evolution of gas to swell the slip, and thereafter drying the slip.

MAXWELL L. WHITACRE.
PETER DE LEEUW.